(12) United States Patent
Pecjak et al.

(10) Patent No.: US 9,848,239 B2
(45) Date of Patent: Dec. 19, 2017

(54) PROJECTING PERSON-LEVEL VIEWERSHIP FROM HOUSEHOLD-LEVEL TUNING EVENTS

(71) Applicant: comScore, Inc., Reston, VA (US)

(72) Inventors: Frank Eugene Pecjak, Fairfax, VA (US); Ramzi Joseph Nasr, Falls Church, VA (US); Magid M. Abraham, Great Falls, VA (US); Ying Li, Reston, VA (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 14/628,106

(22) Filed: Feb. 20, 2015

(65) Prior Publication Data

US 2016/0249098 A1 Aug. 25, 2016

(51) Int. Cl.
*H04H 60/33* (2008.01)
*H04N 21/442* (2011.01)
*H04N 21/258* (2011.01)
*H04N 21/24* (2011.01)
*H04N 21/25* (2011.01)

(52) U.S. Cl.
CPC ... *H04N 21/44222* (2013.01); *H04N 21/2407* (2013.01); *H04N 21/25883* (2013.01); *H04N 21/44204* (2013.01); *H04N 21/44218* (2013.01); *H04N 21/251* (2013.01)

(58) Field of Classification Search
CPC ............ H04N 21/2407; H04N 21/254; H04N 21/258; H04N 21/25866; H04N 21/25883; H04N 21/25891; H04N 21/441; H04N 21/442; H04N 21/44204; H04N 21/4508; H04N 21/4532
See application file for complete search history.

(56) References Cited

U.S. PATENT DOCUMENTS

| | | | |
|---|---|---|---|
| 8,453,173 B1* | 5/2013 | Anderson | H04H 60/45 705/14.25 |
| 2003/0067554 A1* | 4/2003 | Klarfeld et al. | 348/461 |
| 2006/0168613 A1* | 7/2006 | Wood et al. | 725/11 |
| 2008/0300965 A1* | 12/2008 | Doe | 705/10 |
| 2011/0067044 A1 | 3/2011 | Albo | |

(Continued)

OTHER PUBLICATIONS

Office Action issued in U.S. Appl. No. 14/250,799 dated Feb. 23, 2015, 13 pages.

(Continued)

*Primary Examiner* — John Schnurr
(74) *Attorney, Agent, or Firm* — Baker & Hostetler LLP

(57) ABSTRACT

The present disclosure describes techniques for projecting person-level viewership from household-level tuning events. One example method includes accessing tuning data representing television tuning events associated with particular households; accessing panelist viewing data representing television viewing events associated with panelists; and for at least one tuning event represented by the tuning data: accessing household member data associated with the tuning event; determining a member minutes value associated with each individual member of the particular household for the tuning event; and determining a fractional viewership value for each individual member of the particular household associated with the tuning event.

21 Claims, 7 Drawing Sheets

(56) References Cited

U.S. PATENT DOCUMENTS

2011/0239253 A1  9/2011  West
2012/0030702 A1  2/2012  Joao
2012/0260278 A1  10/2012  Lambert

OTHER PUBLICATIONS

Office Action issued in U.S. Appl. No. 13/669,594 dated Jun. 12, 2013, 14 pages.
Notice of Allowance issued in U.S. Appl. No. 13/669,594 dated Jan. 9, 2014, 8 pages.
Office Action issued in U.S. Appl. No. 14/250,799 dated Jul. 28, 2014, 8 pages.

* cited by examiner

PROJECTING PERSON-LEVEL VIEWERSHIP FROM HOUSEHOLD-LEVEL TUNING EVENTS

BACKGROUND

Television advertising relies on program and network viewership data in order to determine the expected reach of advertising slots. Advertisers are interested in numbers of viewers as well as the demographics of viewers in order to effectively manage television advertising timing and content. Understanding television audience viewing and habits may be useful in supporting advertising planning, buying, and selling.

SUMMARY

The present disclosure describes techniques for projecting person-level viewership from household-level tuning events. One example method includes accessing tuning data representing television tuning events associated with particular households, each tuning event in the tuning data including an identification of a particular television program associated with the tuning event and a household minutes value representing a number of minutes the particular television program was played at a particular household in association with the tuning event; accessing panelist viewing data representing television viewing events associated with panelists, each viewing event in the viewing data including an identification of a particular television program associated with the viewing event and a panelist minutes value representing a number of minutes a panelist was exposed to the particular television program during the viewing event, each panelist associated with panelist information; and for at least one tuning event represented by the tuning data: accessing household member data representing member information on individual members of a particular household associated with the tuning event; determining a member minutes value associated with each individual member of the particular household for the tuning event, the member minutes value based at least in part on panelist minutes values for television viewing events from at least a portion of the panelist viewing data associated with members of panelist households whose panelist information matches at least a portion of the member information of the individual member; determining a fractional viewership value for each individual member of the particular household associated with the tuning event, the fractional viewership value representing a probability that the individual member watched the television program associated with the tuning event, the fractional viewership value based at least in part on the portion of the panelist viewing data associated with members of panelist households whose panelist information matches at least a portion of the member information of the individual member.

Another example method includes accessing tuning data representing television tuning events associated with particular households, each tuning event in the tuning data including an identification of a television program played in association with the tuning event, and a household minutes value representing a number of minutes the television program was played at a particular household in association with the tuning event; accessing panelist viewing data representing television viewing events associated with panelists, each viewing event in the viewing data including an identification of a television program associated with the viewing event, and a panelist minutes value representing a number of minutes a particular panelist was exposed to the television program during the viewing event, each panelist associated with panelist information; identifying group subsets within the tuning data, each group subset including tuning data having matching values for a group criteria including attributes included in the tuning data and the panelist viewing data; identifying a particular television program for which to calculate unique viewers and person-level minutes; and for at least one particular group subset from the identified group subsets within the tuning data: identifying matching panelist viewing data for the particular group subset, the matching panelist viewing data including panelist viewing data having matching values for the group criteria associated with the particular group subset; calculating a unique viewers value for the particular group subset based on the matching panelist viewing data, wherein the unique viewers value represents an estimated number of individual members of households associated with the tuning data included in the group subset that watched the particular television program; calculating a person-level minutes value for the group subset based on the matching panelist viewing data, wherein the person-level minutes value represents an estimated number of minutes individual members of households associated with the tuning data included in the group subset watched the particular television program.

Another example method includes accessing tuning data representing television viewing events associated with particular households, each tuning event in the tuning data including an identification of a particular television program watched during the tuning event, and a household minutes value representing a number of minutes the particular television program was played at a particular household in association with the tuning event, the tuning data divided into rostered tuning data for particular households associated with household member data and non-rostered tuning data for particular households not associated with household member data, wherein the household member data includes information about individual members of the particular household; accessing panelist viewing data representing television viewing events associated with panelists, each viewing event in the viewing data including an identification of a particular television program watched during the viewing event, and a panelist minutes value representing a number of minutes a particular panelist member was exposed to the particular television program during the viewing event, each panelist associated with panelist information; generating person-level viewing data for tuning events represented by the rostered tuning data, the person-level viewing data based at least in part on the panelist viewing data and including second viewing events, each second viewing event including a member minutes value and a fractional viewership value associated with an individual member of a household associated with household member data; calculating unique viewers values and person-level minutes values for the non-rostered tuning data based on the panelist viewing data and the person-level viewing data.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1:
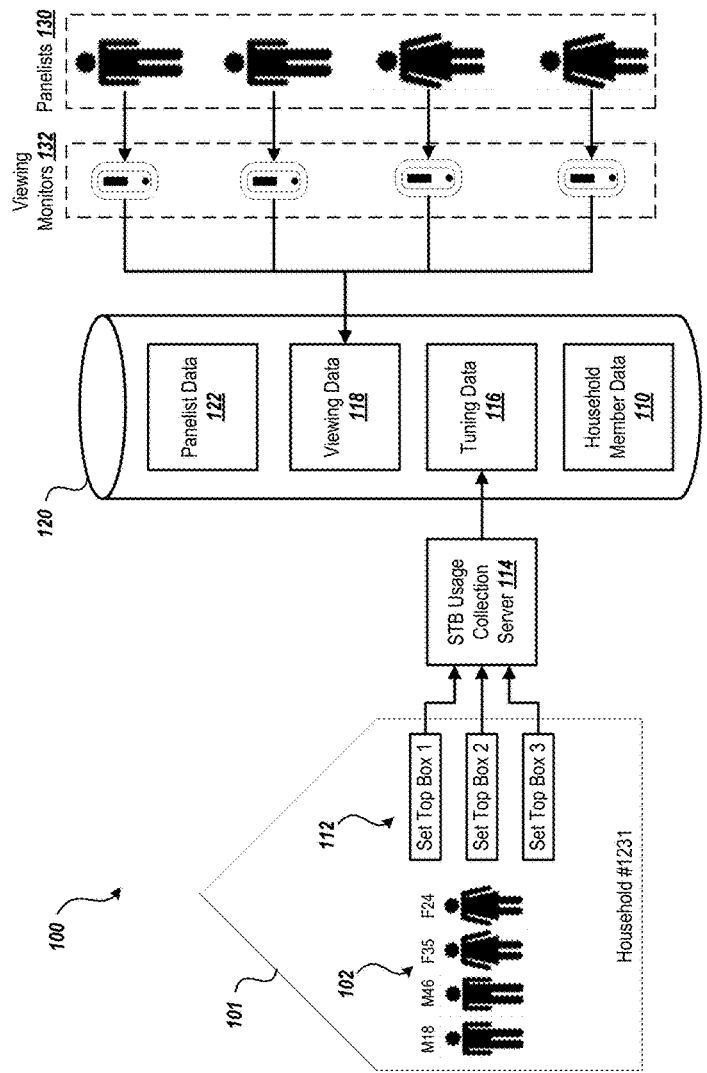
FIG. 1 illustrates an example of a system in which television viewership information may be collected and processed to determine audience measurement data.

Estimates of television (TV) viewership may be used by content providers, advertisers, and others to estimate the number of people that viewed a particular television program, advertisement, sporting event, or other content item. TV viewership data can be collected at multiple levels. For example, person-level television viewership may be measured for a set of viewers, referred to as "panelists," who, in some cases, have agreed to have their viewing behavior monitored. For example, the measured viewership may be used for the purposes of producing viewing estimates. Each panelist may be associated with demographic information, such as, for example, the gender of the panelist, the age of the panelist, the income of the panelist, a geographic area in which the panelist lives, a size of the panelist's household, and other information. In some cases, each panelist may be given a monitoring device to keep on their person, which monitors audio signals to determine if the panelist is watching a television program, and identifies the television program being watched. For example, the monitoring device may detect encoded signals within the television program audio identifying the television program. The monitoring device may also identify the television program from the detected audio by other mechanisms, such as, for example, by generating an acoustic fingerprint for the detected audio and consulting a database mapping acoustic fingerprints to television programs. Viewership data for the panelists, or "person-level data," may be collected from the monitoring devices (e.g., by transferring the data to an external server over a network such as the Internet), and may be further analyzed to determine statistics, trends, and other information regarding viewership of television programs. In some cases, the person-level data may be used to project viewership statistics for larger populations, such as the total number of viewers or viewing minutes for a television program for a particular demographic or a particular geographic area. However, collecting person-level data from panelists is logistically complex, and thus the sample size of the person-level data may be small, leading to a large margin of error in projections of viewership data for larger populations.

Television viewership can also be measured at the household level, such as, for example, by a set-top-box logging viewing activity. This "household-level data" may be easier to obtain for a large sample of viewers, but may not provide any information regarding which members of the household (if any) watched a particular television program. It may be difficult to accurately project individual viewership numbers (e.g., the number of unique individual viewers for the particular program) from this household-level data, which, as stated, may not include any information regarding which members of the household (if any) watched the particular television program.

Various techniques may be employed for projecting person-level viewership from household-level data. For example, given a set of person-level viewership data and a household-level television viewing event for a particular program, fractional viewership values representing probabilities that individual members of the household participated in the television viewing event may be determined based on a portion of the person-level viewership data matching the demographic profile of each individual member. In particular, viewing events in the person-level data representing individual panelists matching the demographic profile of the individual member may be examined to determine a probability that the individual member viewed the particular program, such as by calculating a ratio of the number of panelists with the demographic profile that watched the program over the total number of panelists with the demographic profile.

Similarly, a projected number of viewing minutes that the particular program was viewed by individual members of the household may be determined. In particular, viewing events in the person-level data representing individual panelists matching the demographic profile of an individual member may be examined to determine an average amount of time the panelists viewed the particular program. This number can be used to project the number of minutes that the individual member participated in the particular television viewing event. In some cases, this calculation may be lead to total projected viewing minutes for all individual members of the household is larger than the duration of the television viewing event, representing cases where the projections indicate that multiple people were watching the program in the household at once.

By repeating these projections for a large set of household-level viewing events, a larger person-level data set can be projected. Such a set can be used to calculate metrics for larger populations, such as total audience size or total number of viewing minutes for the particular program within households in a certain geographic area, with greater accuracy than may be possible using smaller samples of direct-measured, person-level data.

Additional techniques to improve accuracy of the projections, such as weighting the person-level data to remove bias, may be performed, and are described in greater detail below. In addition, although the present disclosure generally describes the present techniques in the context of television viewership calculation, the techniques may be used to perform audience calculation for other types of content, including music, webpages, streaming video over the Internet, and other content.

Some or all of the techniques described may provide one or more advantages. For instance, by performing audience projections based on the person-level data and the household-level data, the relative shortcomings of both data sets (e.g, small sample size and lack of specific viewer information, respectively) may be mitigated. Further, the techniques described herein may allow for the integration of person-level data and household-level data from multiple sources into the same model, which may lead to further improvements in projection accuracy. Viewing within particular demographic groups may also be projected for households where individual member information is not known based on the observed and projected person-level data, providing more accurate and useful viewership information to broadcasters, advertisers, and others.

FIG. 1 illustrates an example of a system 100 in which television viewership information may be collected and processed to determine audience measurement data. The system 100 includes a number of households, such as household 101, that include one or more set-top boxes 112 for viewing television programs. The set top boxes 112 record data for tuning events (e.g., viewing events), which may represent a particular television network or program being watched at a particular time. The set top boxes 112 may report these tuning events to a set top box usage collection server 114, which may store tuning data 116 representing these tuning events in a database or other storage 120. In addition to tuning events, the tuning data 116 may include data to identify the household 101 and set top box 112, stream control data, data representing content recorded by the set top box 112, programs ordered on the set top box 112, and data about when the set top box 112 was on or off. Other data about the status of the set top box 112 and user interaction with the set top box 112 may also be recorded and included in tuning data 116.

The household 101 include one or more members 102 that use the set-top boxes to watch television. These members 102 may be associated with demographics, such as age and gender, and these demographics may be collected and stored in storage 120 or another storage as household member data 110. In the example shown, the household 101 includes four members 102: an 18-year-old male, a 24-year-old female, a 35-year-old female, and a 46-year-old male. Their specific age and gender may be stored in household member data 110, or the members may instead be associated with demographic groups. For example, each member 102 may be associated with an age group (for example: 18-24, 25-34, 35-44, 45-54, 55-64, or 65+), rather than specific age. This information may also be stored in the household member data 110. Other demographics may be collected, such as occupation, income, or ethnicity. In addition, a geographic area or location for the household 101 may be stored in the household member data 110. In some cases, the geographic area or location for the household 101 may be stored as a demographic attribute of the individual members of the household.

The demographic information for the household members 102 may be collected in a number of ways. For example, the household 101 may be recruited to be part of a television viewing panel that is used to determine television viewership data. Once the household 101 is recruited, the demographic information may be collected as part of a registration process.

In another example, the household 101 may be a part of, or recruited into, an Internet usage panel that is used to determine Internet usage. Demographic information of the household members 102 may be collected when the household 101 is registered to be part of the Internet usage panel. As part of the Internet usage panel, the household 101 may have a panel application installed on one or more client systems in the household. The panel application may collect internet usage data to send to an internet usage collection server. In some implementations, the internet usage data could be used to infer information about household member 102, such as by comparing internet content accessed by each member 102 with demographic or other information about users accessing the same content. Other methods may be used to capture or confirm information about members 102 of the household 101, such as survey data or data captured from other household behaviors, or data provided by third party services that attempt to determine demographic data of household members 102.

The system 100 includes a plurality of panelists 130. The panelists 130 may be persons who have provided demographic and other information about themselves, and who opted to have their television viewing behavior monitored. The panelist data 122 stored in the data store 120 includes the demographic and other information provided by or otherwise obtained from the panelists 130. In some cases, the panelists 130 may be associated with households having associated information, such as household size, household roster, and other information, which may be included in panelist data 122. In some implementations, the viewing data 118 may represent viewing data from panelists 130 associated with households including only other panelists, such that a complete representation of all television viewing within the household is included in the viewing data 118.

In some implementations, the viewing data 118, unlike the tuning data 116, may represent person-level viewing activity for the individual panelists 130. For example, a television viewing event in the viewing data 118 may represent a particular panelist 130 watching a television program for a period of time, as opposed to the tuning data 116, which may represent the television program being watched in the household for a period of time, but may not represent which of the individual members of the household watched the program.

Each of the panelists 130 is associated with a viewing monitor 132. In some cases, the viewing monitors 132 may be portable computing devices carried by each of the panelists 130 that monitor television viewing by the panelist carrying the device. For example, the viewing monitors 132 may be devices operable to capture and analyze sound information to determine if the panelist 130 is watching a particular television program. In some cases, the viewing monitors 132 may extract encoded signals from the sound information identifying the particular television program being watched by the panelist 130. The viewing monitors 132 may also identify the particular television program from the sound information using other mechanisms, such as, for example, by generating acoustic fingerprint from the sound information in querying a database mapping known acoustic fingerprints to television programs. In some implementations, the viewing monitors 132 may monitor other types of information to determine a television program being watched by the panelist 130, such as, for example, video information, radio frequency (RF) signals, infrared (IR) signals, or other information.

The viewing monitors 132 produce viewing data 118 representing viewing activity by the panelists 130. In some implementations, the viewing monitors 132 may provide viewing data 118 directly to the data store 120. The viewing monitors 132 may also provide the viewing data 118 to a separate collection server or set of servers, and the viewing data 118 may be acquired by or otherwise stored in the data store 120. In some implementations, the viewing data 118 includes information regarding television viewing events, such as, for example, a television program being watched, a television network, an entity operating the television network, a start time and stop time for the television viewing event, an identifier of the panelist 130 associated with the television viewing event, or other information.

When reporting tuning events, the set top boxes 112 may not be able to directly report the particular household member or members 102 associated with each tuning event. For example, in some implementations, the tuning data 116 may include episode viewership for the household 101, but may not include a breakdown of the viewership of individual members of the household 102. As described further below, the household member data 110, tuning data 116, viewing data 118, and panelist data 122 may be used to determine, for a given program, values for members 102 of the household 101 that represent the probability that the corresponding member 102 watched the program, as well as to project a number of watched minutes for the viewing event for each individual member 102 of the household 101. These values can be aggregated for various demographic groups in order to generate demographic viewership data for the episode, program, or network.

Figure 2:
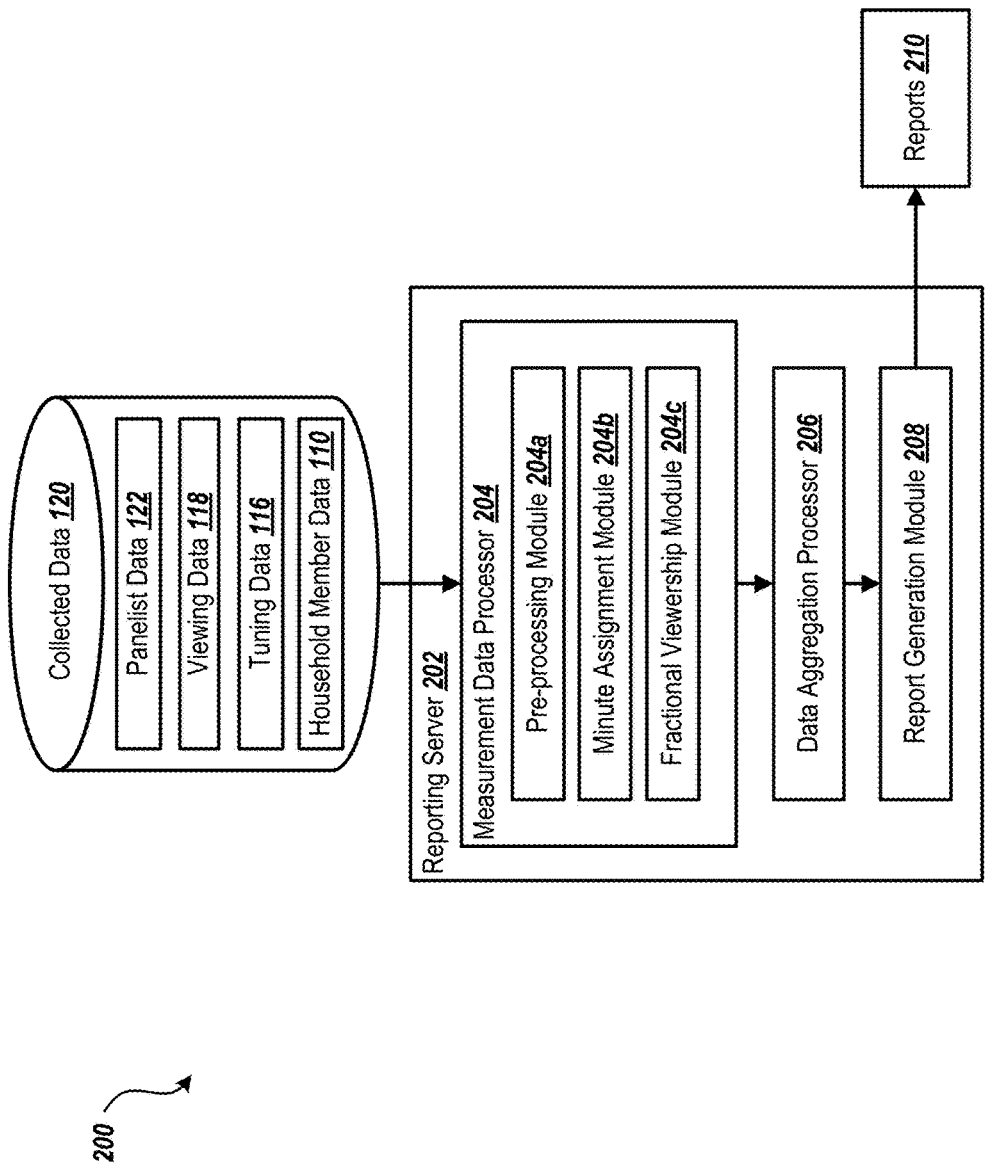
FIG. 2 illustrates an example of a system in which person-level viewing data can be used to project person-level viewership data for a household from household-level tuning data through demographic attribution.

FIG. 2 illustrates an example of a system in which person-level viewing data can be used to generate projected person-level viewing data from household-level tuning data through demographic attribution. The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 202.

The reporting server 202 executes instructions that implement a measurement data processor 204, a data aggregation processor 206, and a report generation module 208. The measurement data processor 204 includes a pre-processing module 204a, a minute assignment module 204b, and a fractional viewership module 204c. The measurement data processor 204 and report generation module 208 may be operable to generate viewership data based on the household member data 110, tuning data, 116, viewing data 118, and panelist data 122 and use that data to generate one or more reports 210 that include information regarding episode-level, program-level, network-level, or entity-level viewership.

Figure 3:
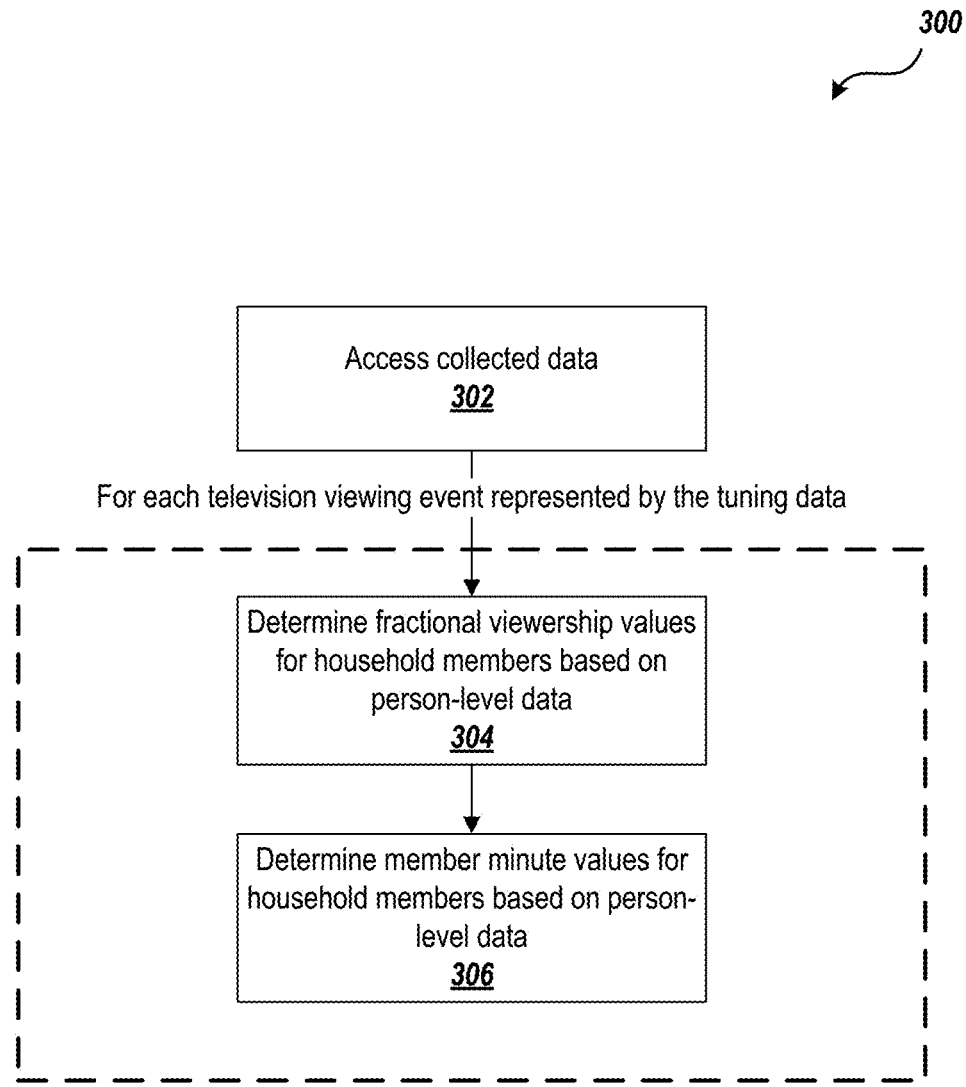
FIG. 3 is a flow diagram illustrating an example of a process for using person-level viewing data to project person-level viewership from household-level tuning data through demographic attribution.

FIG. 3 is a flow diagram illustrating an example of a process for using person-level viewing data can to project person-level viewership from household-level tuning data through demographic attribution. The following describes the process 300 as being performed by components of the reporting server 202 with respect to data associated with the household 101. However, the process 300 may be performed by other systems or system configurations and implemented with respect to other members of the viewing audience.

The pre-processing module 204a accesses the collected data 201, including household member data 110, tuning data 116, viewing data 118, and panelist data 122 (302). The pre-processing module 204a may perform one or more pre-processing functions on the household member data 110, tuning data 116, viewing data 118, and panelist data 122 as appropriate.

In some cases, the pre-processing module 204a may identify particular elements of the household member data 110 for use in comparison with the panelist data 122 associated with the viewing data 118, such as age category, gender, race, occupation, geographic area, or other elements. Information about the household as a whole, such as household size or income, may also be identified for use. Each household member 102 may be identified by one or more demographic dimensions relevant to the particular application of the demographic attribution model.

In some cases, the pre-processing module 204a may sort the household member data 110 into particular demographic categories for demographic attribution. The pre-processing module 204a may also sort the viewing data 118 into particular demographic categories based on the particular panelist 132 associated with each viewing event in the viewing data 118. The pre-processing module 204a may identify the particular program associated with a household event within the tuning data 116. In some cases, the pre-processing module 204a may examine the demographic distribution of the panelists 132 associated with the viewing data 118, and may apply weighting factors to the viewing data 118 to correct any bias in the demographics of the panelists. For example, if the panelists 132 include 80% females and 20% males, the pre-processing module 204a may apply a negative weighting factor to data from female panelists and a positive weighting factor to male panelists to correct for the gender bias in the sample. This gender bias is indicated by the demographics of the sample being dissimilar to the demographics of the population as a whole (i.e., an 80% female sample may not be representative of the overall population, which is roughly 50% female).

In some implementations, the pre-processing module may extract the tuning event data for the television viewing event from a larger collection of tuning data 116 involving multiple tuning events. In some implementations, other relevant tuning events may also be extracted (such as simultaneous events as further described below).

In some implementations, the television viewing event may be associated with a particular episode of a television program. In some implementations, the television viewing event may not be associated with a particular program but may be associated with tuning data 116 such as a date, time, and television network.

The pre-processing module 204a may extract the viewing data 118 for demographic groups matching the individual members of the household 101 and demographic groups from households that match the household 101 as a whole. For the example of the household 101 as shown in FIG. 1, the pre-processing module 204a may extract the viewing data for 18-year-old males in households with four people, 24-year-old females in households with four people, 35-year-old females in households with four people, and 46-year-old males in households with four people.

The viewing data 118 may be for the viewership of television viewing events sharing one or more characteristics with the television viewing event represented by the tuning data 116. For example, where the tuning data 116 represents a television viewing event represented by a particular episode of a television program, the viewing data 118 may be for the viewership of the television program by the panelists 132. If the television viewing event is represented by a date, time, and network, the viewing data 118 may be for the viewership of the network at the date and time by the panelists 132.

Actions 304 and 306 are performed for each television viewing event represented by the tuning data 116. For each television viewing event, the fractional viewership module 204c determines fractional viewership values for the individual members of the particular household based on the household member data 110, the viewing data 118, and the panelist data 122 (304). The fractional viewership values for a given member of the household represents the probability that member viewed the particular event.

In some cases, the fractional viewership module 204c calculates the fractional viewership values for a particular television viewing event in the tuning data 116 for each member 102 of a household 101 by determining a set of the viewing data 118 associated with panelists 130 having matching demographic information to the individual members 102 of the household 101. For example, to determine a fractional viewership value for the 18-year-old male member of household 101, the fractional viewership module 204c may examine viewing data 118 associated with panelists in the same demographic group (e.g., ages 18 to 24). The fractional viewership module 204c may calculate the percentage of panelists associated with this set of the viewing data 118 that watched the television program associated with the particular television viewing event, and may assign this percentage as the fractional viewership value for the 18-year-old male member of household 101 for the particular television viewing event. In some implementations, a combination of demographic groups may be matched between the individual members 102 and the panelists 130, including, but not limited to, gender, race/ethnicity, income, occupation, household size, household demographic makeup, geographic area, or other groups.

More formally, the probability of a member i with demographic characteristics $d_i$ viewing content s in a household h can be computed to represent the viewership of that member. In addition to the demographic characteristics of the member i ($d_i$), the demographic characteristics of all household members in h, denoted by $D_h$, are taken into account in determining the probability of viewing. The person demographic characteristics, $d_i$, can include age and gender, while the characteristics of the household, $D_h$, can include the household size, the race/ethnicity, and a collection of age/gender entries of all persons in the household (we refer to this as 'household composition"). The probability of a member i in household h to view content s can be calculated in two steps:

The first step estimates the total number of persons viewing the content in household h. This is obtained using a persons-to-viewers conversion factor learned from the training data (person-level data):

$$C_{D_h,s} = n_{D_h,s}/N_{D_h}$$

where $C_{D_h,s}$ is the conversion factor, $n_{D_h,s}$ is the projected number of viewers of content s in households characterized by $D_h$, and $N_{D_h}$ is the total projected number of persons in households characterized by $D_h$. The expected number of viewers in household h can be calculated by multiplying the conversion factor by the number of persons in h.

The second step in assigning the probability of viewing to a member i of the household consists of attributing the correct proportion of viewers computed in the first step to i. The proportion is obtained from the training data as follows:

$$P_{D_h,d_i,s} = n_{d_i,D_h,s}/N_{D_h,s}$$

where $n_{d_i,D_h,s}$ denotes the projected number of viewers of s with demographics di and belonging to households characterized by $D_h$, and $N_{D_h,s}$ consists of the projected number of persons in households characterized by $D_h$ and that had a tuning event of s.

To calculate the probability that member i viewed content s in household h, the results of the first and second steps are used:

$$P(V_i^s|d_i,D_h) = P_{D_h,d_i,s} \times C_{D_h,s} \times N_h$$

where $N_h$ is the number of persons in household h. Note that the proportions computed in step 2 are in some cases normalized to add up to 1.0.

The minute assignment module 204b of the measurement data processor 204 determines member minute values for the particular television viewing event for each individual member of the household based on the viewing data 118 (306). The member minute values represent the projected number of minutes each individual member of the household participated in the television viewing event. In some cases, the minute assignment module 204b may determine a set of the viewing data 118 associated with panelists 130 having matching demographic information to the individual members 102 of the household 101. The minute assignment module 204b may also use the same set of viewing data determined by the fractional viewership module 204c at 304. From this set of viewing data, the minute assignment module 204b may determine an average number of minutes that panelists 130 represented by the set watched the television program represented by the particular television viewing event. From this, the minute assignment module 204b may project a number of minutes that the individual member participated in the particular television viewing event. For example, if the set of viewing data indicates that panelists 130 with matching demographics to the individual member watched an average of seven minutes of the television program, but the television viewing event indicates that the program was viewed for 30 minutes by the household, the individual member can be projected to watched seven minutes of the total 30 minute viewing event. In some cases, the member minute values for all individual members in the household for a particular viewing event may sum to a value greater than the number of minutes for the household for the particular viewing event. This represents cases of "co-viewing" of the television program by multiple individual members at once, and provides a more granular view of television viewing activity within the household.

In some cases, the minute assignment module for assigning minutes of content s to member i in household h also follows two steps.

The first step estimates the total number of person-minutes of content in household h based on the observed household minutes. By using the person-level data and filtering to those households where all members are known, the household minutes can be computed by counting the number of unduplicated minutes across the members. The household-minute-to-person-minute conversion factor is then obtained from the training data (person-level data):

$$F_{D_h,s} = m_{D_h,s}/M_{D_h}$$

where $F_{D_h,s}$ is the conversion factor, $m_{D_h,s}$ is the number of person minutes of content s in households characterized by $D_h$, and $M_{D_h}$ is the number of household minutes in households characterized by $D_h$. The expected number of person minutes in household h can be calculated by multiplying the conversion factor by the number of household minutes in h.

The second step in assigning the probability of viewing to a member i of the household consists of attributing the correct proportion of person minutes computed in the first step to i. The proportion is obtained from the training data as follows:

$$Q_{D_h, d_i, s} = m_{d_i, D_h, s} / M_{D_h, s}$$

where $m_{d_i, D_h, s}$ denotes the number of person minutes of s with demographics di and belonging to households characterized by $D_h$, and $M_{D_h, s}$ consists of the total number of person minutes in households characterized by $D_h$ and that had a tuning event of s.

To calculate the probability that member i viewed content s in household h, the results of the first and second steps are used:

$$M_i = Q_{D_h, d_i, s} \times F_{D_h, s} \times M_h$$

where $M_i$ is the number of minutes assigned to member i, and $M_h$ is the number of household minutes in household h. Note that the proportions computed in step 2 are in some cases normalized to add up to 1.0. In some cases, the data aggregation processor 206 aggregates the household viewership data from the household 101 with further household viewership data accumulated from other households in order to generate various levels of viewership data. For example, the various sets of household viewership data may be aggregated to determine episode viewership data for the episode corresponding to the tuning event. The episode viewership data may itself be broken down into a number of demographics or other group measurements based on what is relevant to the television entity or to advertisers.

The data aggregation processor 206 may further aggregate the episode viewership data for multiple episodes into program viewership data reflecting the viewership demographics for the program as a whole. Program viewership data may be further aggregated from multiple programs appearing on the same network in order to determine network viewership data. If two or more networks are owned by the same entity, the network viewership data may be further aggregated into entity viewership data. At each level, the data may continue to isolate and report on various demographics or may aggregate one or more of the demographic dimensions.

The data aggregation processor 206 may aggregate the data for the tuning events in different households representing the same episode. This produces episode viewership data. In some implementations, aggregating the viewership data involves summing the fractional viewership data in each demographic category and dividing by the number of individuals in that category to arrive at a probability profile for the episode.

In some implementations, an equation for the number of people $N_s$ who viewed the episode s can be calculated as:

$$N^s = \sum_k p^s_{k, D_h} \quad \forall k \in \text{Sample}$$

That is, the sum of the adjusted fractional viewership values over the sample is equal to the estimated number of people from the sample who watched the episode s. As described above, these fractional viewership values $p^s_{k, D_h}$ may include adjustments for the duration of the tuning event relative to the episode duration and other factors.

The data aggregation processor 206 may aggregate the episode viewership data representing episodes of the same program in order to generate program viewership data. In some implementations, the desired statistic is how many viewers are estimated to have seen at least one episode of the program. In this case, the data aggregation processor 206 may use the fractional viewership data associated with each episode and individual in order to produce fractional values representing each individual having watched at least one episode of the program. For example, the fractional viewership values $v_1$ to $v_4$ for a single individual over four episodes may be used to produce a program viewership value $v_p$ representing the probability that the individual watched at least one episode of the program:

$$v_p = 1 - (1 - v_1) * (1 - v_2) * (1 - v_3) * (1 - v_4)$$

In this way, each household member will contribute at most 1 viewer to the program viewership data.

Formally, for all episodes s of a program ṡ, the probability of each person i having viewed at least one episode s is:

$$p^{\dot{s}}_{i, D_h} = 1 - \prod_m \left[1 - p^{\dot{s}_m}_{i, D_h}\right] \quad \forall s_m \in \dot{s}$$

The de-duplicated number of persons who viewed the program ṡ can be calculated by summing up these probabilities. The summation can also be conditioned on a demographic segment.

The data aggregation processor 206 may use similar methods to aggregate program viewership data over multiple programs in order to generate product network viewership data. For example, similar to the calculation above for program viewership data, for all programs ṡ on a network s̈, the probability of each person i having viewed one of the programs ṡ is:

$$p^{\ddot{s}}_{i, D_h} = 1 - \prod_n \left[1 - p^{\dot{s}_n}_{i, D_h}\right] \quad \forall \dot{s}_n \in \ddot{s}$$

The de-duplicated number of persons who viewed a program on network s̈ can be calculated by summing up these probabilities. The summation can also be conditioned on a demographic segment.

The data aggregation processor 206 may similarly aggregate network viewership data over multiple commonly-owned networks in order to generate entity viewership data. For example, for all networks s̈ owned by a common entity e, the probability of each person i having viewed one of the networks s̈ is:

$$p^e_{i, D_h} = 1 - \prod_n \left[1 - p^{\ddot{s}_n}_{i, D_h}\right] \quad \forall \ddot{s}_n \in e$$

The de-duplicated number of persons who viewed a network owned by entity e can be calculated by summing up these probabilities. The summation can also be conditioned on a demographic segment.

In some implementations, each step of the process may use one or more of the aggregation techniques described above, or others appropriate to allowing for overlap and other factors relevant to aggregation at that level.

The report generation module 208 may generate viewership reports 210 based on the aggregated viewership data. These reports may include data at any level of aggregation, and may be specified by a user. Reports may include the viewership data of various demographic groups as estimated through the use of demographic attribution. Entities may request particular demographic data and data at a particular level of aggregation.

For example, a program-level report may show that a particular program has been watched by 12% of males ages 18-24. A network-level report may show that 45% of viewers of a particular network are females above age 40. An entity-level report may show that 57% of males and 25% of females watched at least one of the entity's sports networks during the time period representing this year's regular baseball season.

Because a household may have more than one set top box and more than one display device, at times there may be more than one program episode being viewed at a time by members of a household. In some implementations, the existence of more than one program episode being viewed at the same time in a household may affect the fractional values determined for members of that household for one or both of the viewing events.

In some implementations, the pre-processing module 204a identifies simultaneous events associated with the same household generated by set top boxes. Simultaneous events are those that include at least some overlap in the times in which the events are shown. In some cases, simultaneous events may have to have at least a threshold amount of overlap to be considered simultaneous; that is, nominal overlap between the first and last minutes of events that are primarily at different times may not be identified as simultaneous.

Applying the demographic attribution model as described above generally assumes that viewing data 118, representing the demographics of panelists and whether or not they watch a particular program, is known for the program associated with the event for which event viewership data is to be determined. More formally, in determining $P(V_i^s|d_i, H)$, the probability that a particular household member i watched the episode s given the member's demographic information $d_i$ and household size H, the following equation is used:

$$P(V_i^s \mid d_i, H) = \frac{n_{d_i,H}}{N_{d_i,H}}$$

Where $n_{di,H}$ is the number of persons with demographic characteristics $d_i$ and household size H within the viewing data 118 who are recorded as watching a particular episode of the program, and $N_{di,H}$ is the total number of panelists with demographic characteristics $d_i$ and household size H within the viewing data 118.

In some implementations, the collected data 201 may not include adequate viewing data 118 for a particular program. Formally, the variable $n_{di,H}$ from the above equation is not available, and so the above equation cannot be used to determine $P(V_i^s|d_i, H)$. However, other techniques may be available for determining the probabilities of each household member watching the program. For example, the collected data 201 may include viewership data for the network n and viewership data for a particular time of viewing, δ (such as between 8 pm and 8:30 pm). Formally, the data store 120 may include data sufficient to determine $P(V_i^n|d_i, H)$, the probability that a particular household member i watches the network n, and $P(V_i^δ|d_i, H)$, the probability that a particular household member i watches television at time δ.

In some implementations, the following equation can be applied:

$$P(V_i^s|d_i,H) = P(V_i^n|d_i,H) \times P(V_i^δ|d_i,H)$$

Given a household member's demographics and household size, this equation determines the probability of an individual i watching an episode s for which program viewership data as a product of the probability that the individual watches the network n multiplied by the probability that the individual watches television during the particular time of viewing associated with the episode is not available. Similar alternatives may be available in order to accommodate other missing data as necessary.

Figure 4:
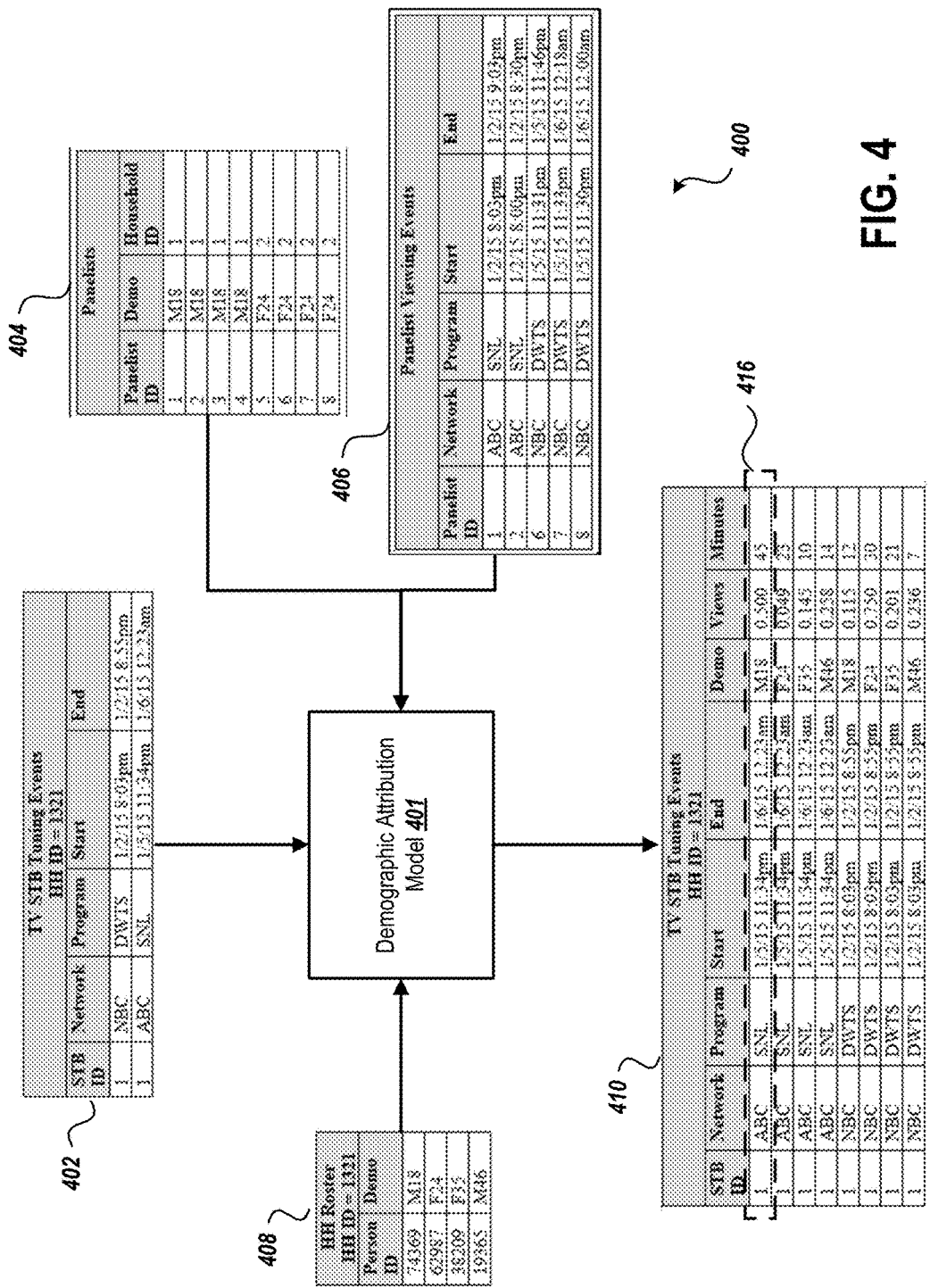
FIG. 4 is a block diagram applying a demographic attribution model to person-level viewing data and household-level tuning data to project person-level viewership for the household.

FIG. 4 is a block diagram applying a demographic attribution model to person-level viewing data and household-level tuning data to project person-level viewership for the household. As shown in a tuning events table 402, a television viewing event occurred on January 2 associated with the show "DWTS" on the network "ABC." Another tuning event occurred on January 5 associated with the show "SNL" on the network NBC. The table 404 shows a roster of panelists having their television viewing activity monitored (as previously described relative to FIG. 1), their associated demographic groups, and their associated households. Table 406 includes television viewing events representing the panelists watching the shows "DWTS" and "SNL."

Table 408 includes a household roster for the household associated with the tuning events in table 402. As shown, that also includes an 18-year-old male, 24-year-old female, a 35-year-old female, and a 46-year-old male.

Demographic attribution model 401 is used to project person-level viewing events in the table 410 from the tuning events in table 402, the household roster in table 408, the panelist roster in table 404, and the panelist viewing events in table 406. For explanatory purposes, the following discussion will focus on example event 416 in the person level viewing events in table 410.

As shown, viewing event 416 associates a demographic of "18-year-old male" to the viewing event for "SNL" for set-top box 1. The viewing event 416 represents the projected person level viewing event for the 18-year-old male in the household (person ID 74369). The viewing event 460 includes a views value of 0.500. This value is a fractional viewership value indicating that the 18-year-old male has a 50% probability of watching this viewing event. In some cases, this probability may be calculated based on panelist viewing events for panelists in the same demographic group (i.e., panelist IDs 1-4). The table 406 shows panelist viewing events for panelist IDs 1 and 2 only. Accordingly, two of the possible four panelists from this demographic watched "SNL," yielding a probability of 50% that the 18-year-old male in the household roster in that demographic watched "SNL."

The viewing event 416 also includes a minutes value of 45 representing the projected number of minutes the 18-year-old male watched "SNL." In some cases, this minutes value may, again, be calculated based on panelist viewing events for panelists in the same demographic group (i.e., panelist IDs 1-4). The table 406 shows panelist viewing events for panelist IDs 1 and 2 only. Panelist ID 1 watched "SNL" from 8:03 PM until 9:03 PM (60 minutes). Panelist ID 2 watched "SNL" from 8:00 PM until 8:30 PM (30 minutes). Accordingly, panelists matching the demographics of the 18-year-old male member of the household watched "SNL" for an average of 45 minutes (i.e., 60minutes+30 minutes/2 panelists).

Figure 5:
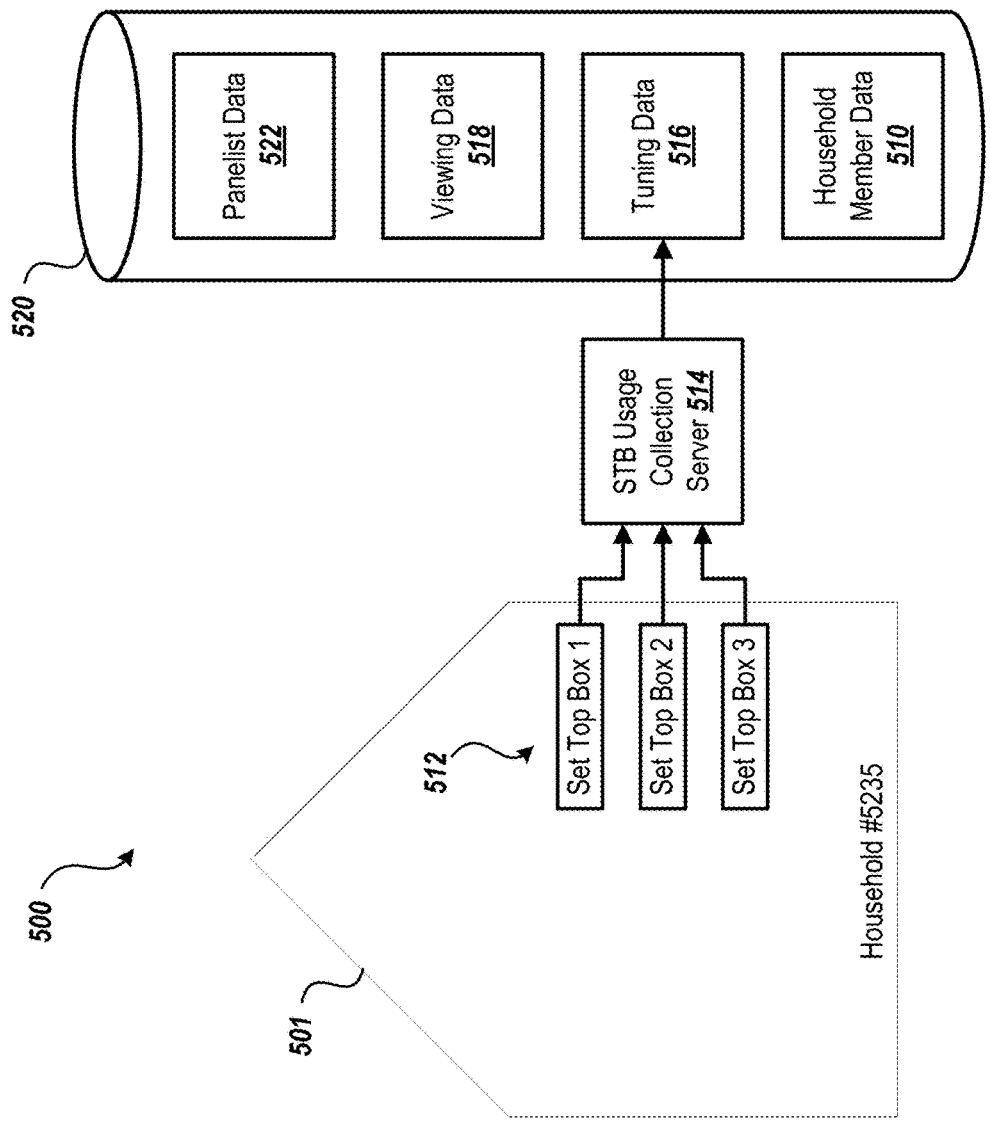
FIG. 5 illustrates an example of a system in which television viewership information may be collected and processed to determine audience measurement data for non-rostered households.

In some implementations, panelists in the demographic that did not watch the show may be included with a zero minute value in an average minutes per audience member calculation. For example, if the table 406 included 2 other 18-year old males who did not watch "SNL," the average minutes per audience member calculation for the program would represent that each 18-year-old male audience member watched the program for 22.5 minutes (i.e., 60 minutes+ 30 minutes+0 minutes+0 minutes/4 panelists). FIG. 5 illustrates an example of a system 500 in which television viewership information may be collected and processed to determine audience measurement data for non-rostered households. Similarly to the system 100 of FIG. 1, system 500 includes a household 501 including set-top-boxes 512 for viewing television content. The set-top-boxes 512 reporting tuning events to the STB collection server 514, which stores the tuning events as tuning 518 in data store 520. The data store 520 also includes household member data 510 having information for individual members of households. In some cases, the household 501 may not be associated with information regarding individual members of the household, making household 501 a "non-rostered" household.

The data store 520 also includes viewing data 518. In some cases, the viewing data 518 may include observed person-level viewing data from one or more panelists associated with panelist data 522, such as described relative to FIG. 1. The viewing data 518 may also include projected person-level viewing data calculated for tuning data 518 for rostered households associated with individual member information in the household member data 510 (e.g., household 101 from FIG. 1) as described in FIG. 3.

Figure 6:
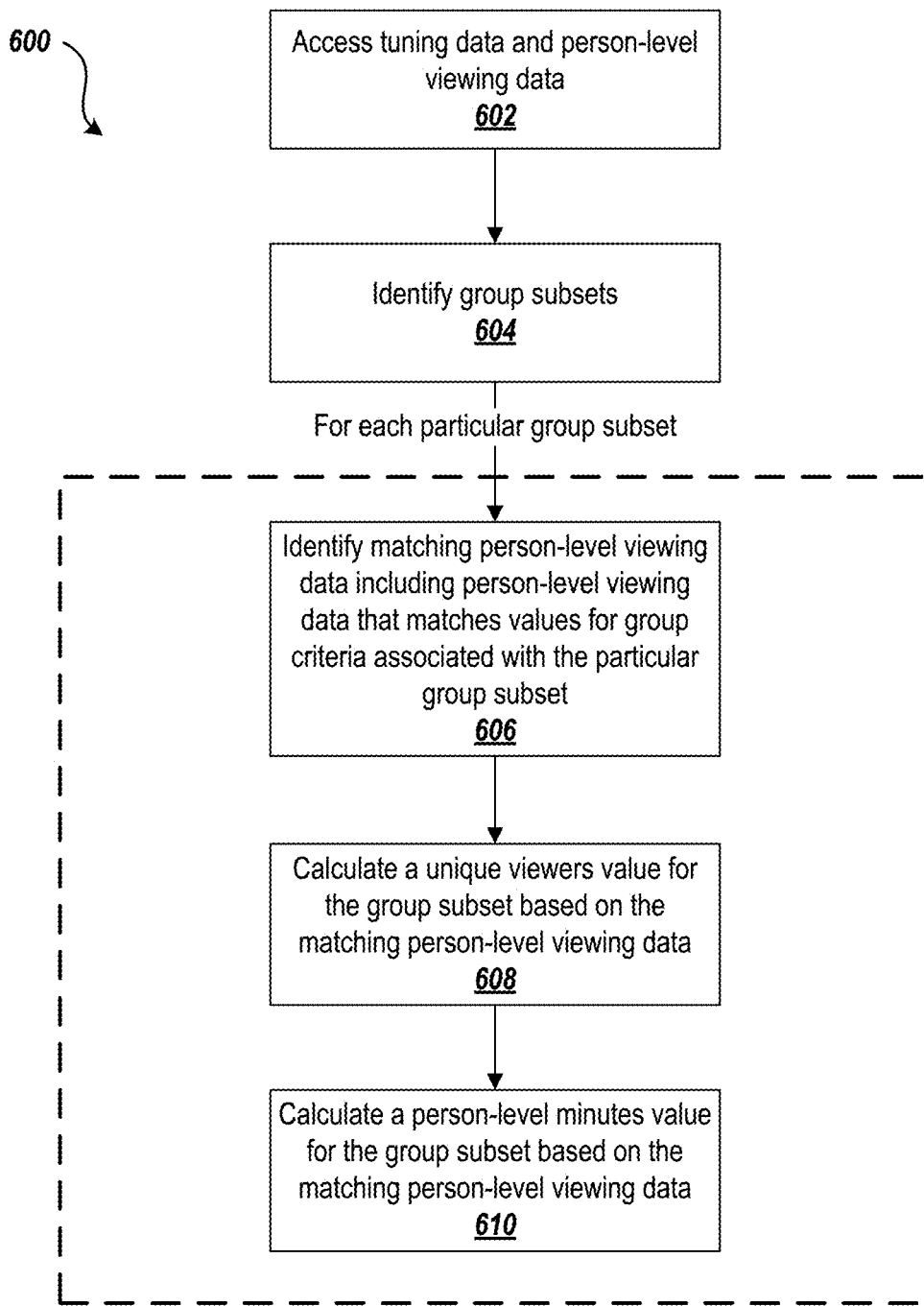
FIG. 6 is a flow diagram illustrating an example of a process for using person-level viewing data to project person-level viewership from non-rostered household-level tuning data.

FIG. 6 is a flow diagram illustrating an example of a process 600 for using person-level viewing data to project person-level viewership from non-rostered household-level tuning data. The following describes the process 600 as being performed by components of the reporting server 202 with respect to data associated with the household 501. However, the process 600 may be performed by other systems or system configurations and implemented with respect to other members of the viewing audience.

The measurement data processor 204 accesses tuning data 516 and person-level viewing data 518 (602). The tuning data 516 may include tuning data for rostered households (e.g., household 101) and non-rostered households (e.g., household 501). In some cases, the tuning data 516 includes a particular television program watched during each viewing event, and a household minutes value representing a number of minutes the particular household watched the particular television program during each viewing event. The person-level viewing data 518 may represent television viewing events associated with panelist members of other households different than the particular household, and may include a particular television program watched during the viewing event, and a panelist minutes value representing a number of minutes the particular panelist member watched the particular television program, each panelist member associated with panelist information. In some cases, the person-level viewing data includes observed viewing data obtained through monitoring viewing behavior of a plurality of panelists, and modeled viewing data obtained by applying statistical projections to household-level data (e.g., the data produced by the process 300 of FIG. 3).

The measurement data processor 204 identifies group subsets including tuning data 516 having matching values for a grouping criteria including attributes included in the tuning data and the person-level viewing data (604). For example, the measurement data processor 204 may identify group subsets of tuning data 516 for particular geographic areas, such that each group subset includes tuning data for households in that region (e.g., a group subset for Texas, another group subset for New York, etc.). The grouping criteria for the group subsets may also include other criteria or combinations of criteria, including number of set-top-boxes, household size, and other criteria.

For each particular group subset identified at 604, the measurement data processor 204 identifies matching person-level viewing data including person-level viewing data that matches values for group criteria associated with the particular group subset (606). For example, for a group subset for the geographic area "Texas," the measurement data processor 204 may identify matching person-level viewing from the viewing data 518 also associated with "Texas."

The measurement data processor 204 calculates a unique viewers value for the group subset based on the matching person-level viewing data (608). In some cases, the unique viewers value represents an estimated number of individual members of households associated with the tuning data included in the group subset that watched the particular television program. In some implementations, calculating the unique viewers value includes determining a members per household number for the matching person-level viewing data, wherein the unique viewers value for the particular group subset is based at least in part on the members per household number.

Calculating the unique viewers value may include calculating a set of demographic unique viewers values, wherein each demographic unique viewers values is associated with a particular one of a plurality of demographic groups and represents an estimated number of individual members in the particular demographic group from households associated with the tuning data included in the group subset that watched the particular television program.

For example, to calculate a unique viewers value for a show called "SNL," the measurement data processor 204 may determine a members per household number of 2.5 for Texas by determining the average number of persons in households represented by the viewing data 518 (e.g., by dividing the total number of persons in all households by the number of households). The measurement data processor 204 may also determine that 80% of viewers represented by the viewing data 518 watched SNL. If the non-rostered tuning data represents 10 households, the measurement data processor 204 may estimate that these households include 25 individual members (e.g., 10 households×2.5 members per household), and that 20 of them watched SNL based on 80% viewership. If the viewing data shows that viewers for SNL were 60% male and 40% female, the measurement data processor 204 may estimate that 12 males (60% of the 20 estimated viewers) and 8 females (40% of the 20 estimated viewers) watched SNL in the 10 households.

The measurement data processor 204 calculates a person-level minutes value for the group subset based on the matching person-level viewing data (610). In some implementations, the person-level minutes value represents an estimated number of minutes individual members of households associated with the tuning data included in the group subset watched the particular television program. In some cases, calculating the person-level minutes value for the group subset includes determining a co-viewing factor for the matching person-level viewing data representing a ratio of household-level viewing minutes to person-level viewing minutes for the group subset, wherein the person-level minutes value for the group subset is based at least in part on the co-viewing factor.

Calculating the person-level minutes value for the group subset may include determining a co-viewing factor for the matching person-level viewing data representing a ratio of household-level viewing minutes to person-level viewing minutes for the group subset, wherein the person-level minutes value for the group subset is based at least in part on the co-viewing factor. In some cases, calculating the person-level minutes value includes calculating a set of demographic person-level minutes values, wherein each demographic person-level minutes value is associated with a particular one of a plurality of demographic groups and represents an estimated number of minutes individual members in the particular demographic group from households associated with the tuning data included in the group subset watched the particular television program.

For example, to calculate a person-level minutes value for a show called "SNL," the measurement data processor 204 may determine a co-viewing factor of 1.5 for Texas by determining a ratio of person-level minutes to household minutes in households in Texas represented by the viewing data 518 (e.g., by dividing the total number of minutes members watched SNL by total number of minutes households watched SNL). If the non-rostered tuning data represents 10 households that watched SNL for 100 minutes, the measurement data processor 204 may estimate that individual members of these households watched SNL for 150 minutes (e.g., 100 household-level×1.5 co-viewing factor). If the viewing data shows that the person-level minutes in the viewing data for Texas were split such that 80% of the minutes were viewed by males and 20% by females, the measurement data processor 204 may estimate that 120 minutes of the estimated 150 minutes were viewed by males (80% of the 150 estimated minutes) and 30 minutes were viewed by females (20% of the 150 estimated minutes).

In some cases, the plurality of demographic groups are associated with a demographic criteria such as, for example, age, gender, race, or income.

Figure 7:
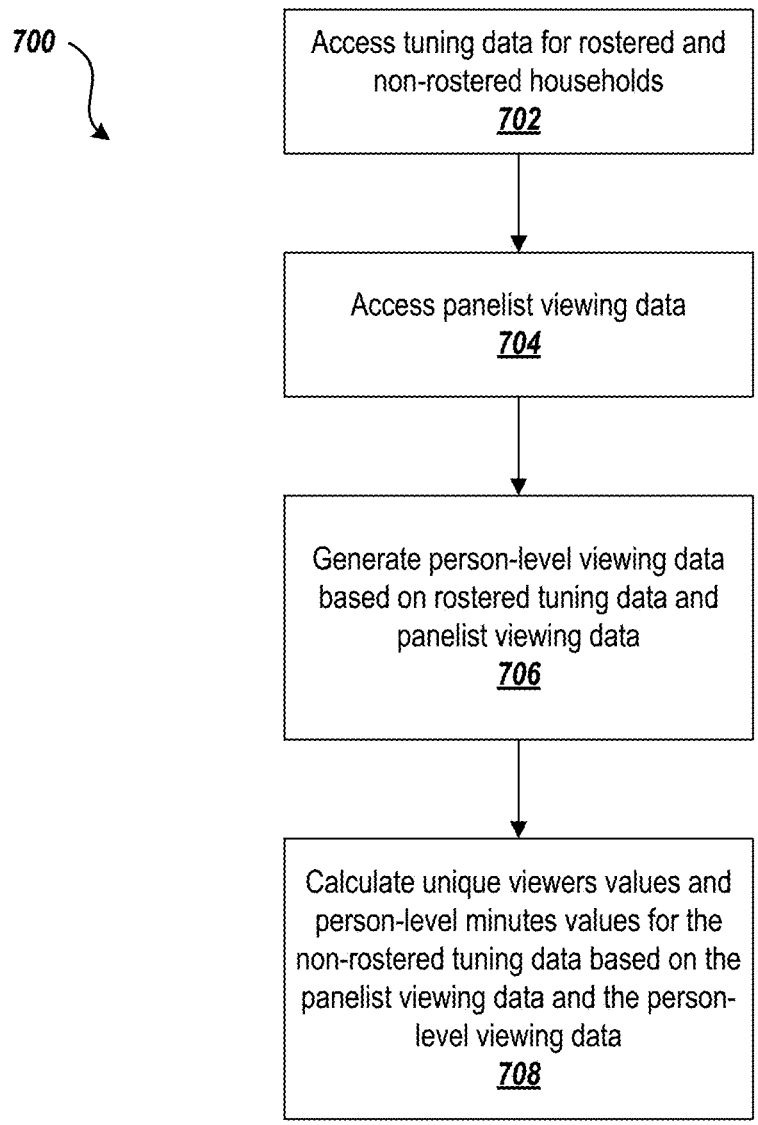
FIG. 7 is a flow diagram illustrating an example of a process for using first person-level viewing data to project second person-level viewing data for rostered households, and using the first and second person-level viewing data to project person-level viewership from non-rostered household-level tuning data.

FIG. 7 is a flow diagram illustrating an example of a process 700 for using panelist viewing data to project second person-level viewing data for rostered households, and using the panelist and person-level viewing data to project person-level viewership from non-rostered household-level tuning data. The following describes the process 700 as being performed by components of the reporting server 202 with respect to data associated with the households 101 and 501. However, the process 700 may be performed by other systems or system configurations and implemented with respect to other members of the viewing audience.

The measurement data processor 204 accesses tuning data 516 representing tuning events associated with particular households (702). The tuning data 516 may include an indication of a particular television program played during each tuning event, and a household minutes value representing a number of minutes the particular television program played during each viewing event. The tuning data 516 may be divided into rostered tuning data for particular households having household member data representing member information on individual members of the particular household and non-rostered tuning data for particular households without household member data.

The measurement data processor 204 accesses panelist viewing data representing television viewing events associated with panelist members (704). The viewing data may include an indication of a particular television program watched during the viewing event, and a panelist minutes value representing a number of minutes the particular panelist member was exposed to the particular television program, each panelist member associated with panelist information. In some cases, a panelist is exposed to a particular television program if the panelist watched the television program, is near enough to the television playing the program for a monitoring device to detect signals representing the television program.

The measurement data processor 204 generates person-level viewing data for tuning events represented by the rostered tuning data based at least in part on the first person-level viewing data and rostered tuning data (706). The person-level viewing data may include member minutes values and fractional viewership values associated with each individual member of the particular households for tuning events associated with the particular households. In some cases, generating the person-level viewing data includes, for each television viewing event represented by the rostered tuning data, determining a member minutes value associated with an individual member of the particular household for the television viewing event represented by the rostered tuning data, the member minutes value based at least in part on panelist minutes values from a portion of the panelist viewing data associated with panelists associated with panelist information matching at least a portion of the member information of the individual member; and determining a fractional viewership value for each individual member of the particular household representing a probability that the individual member watched the tuning event, the fractional viewership value based at least in part on the portion of the panelist viewing data associated with panelist members associated with panelist information matching at least a portion of the member information of the individual member. In some implementations, this may be performed as described relative to FIG. 3.

The measurement data processor 204 calculates unique viewers values and person-level minutes values for the non-rostered tuning data based on the panelist viewing data and the person-level viewing data (708). In some cases, calculating unique viewers values and person-level minutes values for the non-rostered tuning data includes, for each particular group subset, identifying matching person-level viewing data including panelist and person-level viewing data that matches values for the group criteria associated with the particular group subset. A unique viewers value for the group subset may then be calculated based on the matching person-level viewing data, wherein the unique viewers value represents an estimated number of individual members of households associated with the non-rostered tuning data included in the group subset that watched the particular television program. A person-level minutes value for the group subset may also be calculated based on the matching person-level viewing data, wherein the person-level minutes value represents an estimated number of minutes individual members of households associated with the non-rostered tuning data included in the group subset watched the particular television program. In some implementations, this may be performed as described relative to FIG. 6.

Although specific examples using various equations of probability are described herein, the methods described herein can be used with a variety of probability and statistical techniques and are not limited to only the equations and examples shown.

Systems for Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A computer-implemented method comprising:
accessing tuning data representing television tuning events associated with particular households, each tuning event in the tuning data including an identification of a particular television program associated with the tuning event and a household minutes value representing a number of minutes the particular television program was played at a particular household in association with the tuning event;
accessing panelist viewing data representing television viewing events associated with panelists, each viewing event in the viewing data including an identification of a particular television program associated with the viewing event and a panelist minutes value representing a number of minutes a panelist was exposed to the particular television program during the viewing event, each panelist associated with panelist information; and
for at least one tuning event represented by the tuning data:
accessing household member data representing member information on individual members of a particular household associated with the tuning event, wherein the individual members are persons associated with the particular household;
for at least one individual member of the particular household for the tuning event:
identifying matching panelist viewing data for the individual member, the matching panelist viewing data including at least a portion of the panelist viewing data associated with members of panelist households whose panelist information matches at least a portion of the member information of the individual member;
determining a member minutes value associated with the individual member of the particular household for the tuning event, the member minutes value based at least in part on the matching panelist viewing data;
determining a fractional viewership value for the individual member of the particular household associated with the tuning event, the fractional viewership value representing a probability that the individual member watched the television program associated with the tuning event, the fractional viewership value based at least in part on the matching panelist viewing data.

2. The method of claim 1, further comprising:
before determining the member minutes values and fractional viewership values, applying a weighting factor to the panelist viewing data based on a distribution of demographic information associated with the members of panelist households.

3. The method of claim 1, wherein the panelist viewing data is based on monitoring viewing behavior of the members of panelist households.

4. The method of claim 1, wherein determining fractional viewership values for each individual member of the particular household for the tuning event comprises, for at least one of the individual members:
determining that a particular episode of a television program is associated with the tuning event; and
determining a fraction of members of panelist households that watched the particular episode that have panelist information matching the member information for the individual member.

5. The method of claim 1, wherein determining fractional viewership values for each individual member of the particular household for the tuning event comprises, for at least one of the individual members:
determining that a particular television network is associated with the tuning event; and
determining a fraction of members of panelist households that watched the particular television network that have panelist information matching the member information for the individual member.

6. The method of claim 1, wherein determining fractional viewership values for each individual member of the particular household for the tuning event comprises, for at least one of the individual members:
  determining that a particular television entity is associated with the tuning event; and
  determining a fraction of members of panelist household that watched the particular television entity that have panelist information matching the member information for the individual member.

7. The method of claim 1, wherein:
  the tuning data includes a time, date, and television network for each tuning event; and
  determining fractional viewership values for the individual members of the particular household comprises, for at least one of the individual members, determining a fraction of panelist members of other households with panelist information matching the member information for the individual member that watch the television network at the time and date associated with the tuning event.

8. The method of claim 1, wherein the member information includes one or more demographic groups to which the individual member belongs, and the panelist information includes one or more demographic groups to which the panelist member belongs.

9. The method of claim 1, wherein the member information includes a geographic area for the individual member, and the panelist information includes a geographic area for the panelist member.

10. The method of claim 1, wherein the household member data representing member information on the individual members of the particular household associated with the tuning event includes information provided by at least one individual member of the particular household.

11. A computer-implemented method comprising:
  accessing tuning data representing television tuning events associated with particular households, each tuning event in the tuning data including an identification of a television program played in association with the tuning event, and a household minutes value representing a number of minutes the television program was played at a particular household in association with the tuning event;
  accessing panelist viewing data representing television viewing events associated with panelists, each viewing event in the viewing data including an identification of a television program associated with the viewing event, and a panelist minutes value representing a number of minutes a particular panelist was exposed to the television program during the viewing event, each panelist associated with panelist information;
  identifying group subsets within the tuning data, each group subset including tuning data having matching values for a group criteria including attributes included in the tuning data and the panelist viewing data, wherein the group criteria includes at least one attribute of households associated with tuning data included in the group subset;
  identifying a particular television program for which to calculate unique viewers and person-level minutes; and
  for at least one particular group subset from the identified group subsets within the tuning data:
    identifying matching panelist viewing data for the particular group subset, the matching panelist viewing data including panelist viewing data having matching values for the group criteria associated with the particular group subset;
    calculating a unique viewers value for the particular group subset based on the matching panelist viewing data, wherein the unique viewers value represents an estimated number of individual members of households associated with the tuning data included in the group subset that watched the particular television program, and wherein the individual members are persons associated with the particular household;
    calculating a person-level minutes value for the group subset based on the matching panelist viewing data, wherein the person-level minutes value represents an estimated number of minutes individual members of households associated with the tuning data included in the group subset watched the particular television program.

12. The method of claim 11, wherein the panelist viewing data includes observed viewing data obtained through monitoring viewing behavior of a plurality of panelists, and modeled viewing data obtained by applying statistical projections to household-level data.

13. The method of claim 11, wherein the group criteria includes at least one of geographic area, or number of set-top-boxes.

14. The method of claim 11, wherein calculating the unique viewers value includes determining a members per household number for the matching panelist viewing data, wherein the unique viewers value for the particular group subset is based at least in part on the members per household number.

15. The method of claim 11, wherein calculating the person-level minutes value for the group subset includes determining a co-viewing factor for the matching panelist viewing data representing a ratio of household-level viewing minutes to person-level viewing minutes for the group subset, wherein the person-level minutes value for the group subset is based at least in part on the co-viewing factor.

16. The method of claim 11, wherein calculating the unique viewers value includes calculating a set of demographic unique viewers values, wherein each demographic unique viewers values is associated with a particular one of a plurality of demographic groups and represents an estimated number of individual members in the particular demographic group from households associated with the tuning data included in the group subset that watched the particular television program.

17. The method of claim 16, wherein the plurality of demographic groups are associated with a demographic criteria including at least one of age, gender, race, or income.

18. The method of claim 11, wherein calculating the person-level minutes value includes calculating a set of demographic person-level minutes values, wherein each demographic person-level minutes value is associated with a particular one of a plurality of demographic groups and represents an estimated number of minutes individual members in the particular demographic group from households associated with the tuning data included in the group subset watched the particular television program.

19. A computer-implemented method comprising:
  accessing tuning data representing tuning events associated with particular households, each tuning event in the tuning data including an identification of a particular television program watched during the tuning event, and a household minutes value representing a number of minutes the particular television program was played at a particular household in association with the tuning event, the tuning data divided into rostered tuning data for particular households associated with household member data and non-rostered tuning data for particular households not associated with household member data, wherein the household member data includes information about individual members of the particular household, and wherein the individual members are persons associated with the particular household;

accessing panelist viewing data representing television viewing events associated with panelists, each viewing event in the viewing data including an identification of a particular television program watched during the viewing event, and a panelist minutes value representing a number of minutes a particular panelist member was exposed to the particular television program during the viewing event, each panelist associated with panelist information;

generating person-level viewing data for tuning events represented by the rostered tuning data, the person-level viewing data based at least in part on the panelist viewing data and including second viewing events, each second viewing event including a member minutes value and a fractional viewership value associated with an individual member of a household associated with household member data; and calculating unique viewers values and person-level minutes values for the non-rostered tuning data based on the panelist viewing data and the person-level viewing data.

20. The method of claim 19, wherein generating person-level viewing data includes:
  for at least one tuning event represented by the rostered tuning data:
    determining a member minutes value associated with each individual member of the particular household for the tuning event, the member minutes value based at least in part on panelist minutes values from a portion of the panelist viewing data associated with panelists associated with panelist information matching at least a portion of the member information of the individual member;
    determining a fractional viewership value for each individual member of the particular household representing a probability that the individual member watched the tuning event, the fractional viewership value based at least in part on the portion of the panelist viewing data associated with panelists associated with panelist information matching at least a portion of the member information of the individual member.

21. The method of claim 19, wherein calculating unique viewers values and person-level minutes values for the non-rostered tuning data includes:
  identifying a particular television program for which to calculate unique viewers and person-level minutes;
  for at least one particular group subset in a plurality of group subsets of the non-rostered tuning data defined by group criteria:
    identifying matching person-level viewing data including panelist and person-level viewing data that matches values for the group criteria associated with the particular group subset;
    calculating a unique viewers value for the group subset based on the matching person-level viewing data, wherein the unique viewers value represents an estimated number of individual members of households associated with the non-rostered tuning data included in the group subset that watched the particular television program;
    calculating a person-level minutes value for the group subset based on the matching person-level viewing data, wherein the person-level minutes value represents an estimated number of minutes individual members of households associated with the non-rostered tuning data included in the group subset watched the particular television program.

* * * * *